(12) United States Patent
Ashcraft et al.

(10) Patent No.: US 7,792,772 B2
(45) Date of Patent: Sep. 7, 2010

(54) METHOD AND SYSTEM FOR OPTIMIZING CONFIGURATION CLASSIFICATION OF SOFTWARE

(75) Inventors: Kenneth Michael Ashcraft, Meadow Vista, CA (US); Flavio Alvarenga Bergamaschi, Southampton (GB); Viktors Bertsis, Austin, TX (US); Erin Christine Burke, Austin, TX (US); Duy Huynh, Raleigh, NC (US); Santhosh Rao, Austin, TX (US); Duc J. Vianney, Round Rock, TX (US); Peter Wai Yee Wong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/027,734

(22) Filed: Feb. 7, 2008

(65) Prior Publication Data

US 2008/0147583 A1    Jun. 19, 2008

Related U.S. Application Data

(63) Continuation of application No. 11/098,824, filed on Apr. 5, 2005, now Pat. No. 7,370,039.

(51) Int. Cl.
*G06N 5/02* (2006.01)

(52) U.S. Cl. ............................. 706/46; 706/12; 706/21; 706/53

(58) Field of Classification Search ................... 706/46, 706/12, 21, 53
See application file for complete search history.

(56) References Cited

U.S. PATENT DOCUMENTS 6,059,842 A    5/2000    Dumarot et al.

| 6,085,165 A | 7/2000 | Ulwick |
| 6,249,909 B1 | 6/2001 | Russo et al. |
| 6,516,319 B1* | 2/2003 | Benayoun et al. ............ 707/100 |
| 6,704,719 B1* | 3/2004 | Ericson ....................... 706/48 |

(Continued)

OTHER PUBLICATIONS

Grosspietsch Kovalev, IV, Deriving the Optimal Structure of N-Version Software Under Resource Requirements and Cost/Timing Constraints, IEEE Comput. Soc, 2000, p. 1, Publisher: IEE, Published in: US.

(Continued)

*Primary Examiner*—Donald Sparks
*Assistant Examiner*—Mai T Tran
(74) *Attorney, Agent, or Firm*—William H. Steinberg; Suiter Swantz pc llo

(57) ABSTRACT

A method and system to minimize to redundancy in testing a new software system by utilizing a knowledge base is provided. The knowledge base may be represented in a form of a decision tree including leaf nodes which store previously tested optimal configurations. When the knowledge base does not contain an optimal configuration for the new software, an optimal solution for the new software system may be determined by adding a further decision tree branch to the initial decision tree. A desirable tree branch may be selected from a table including a predetermined set of desirable tree branches for each category of software. As a result, the number of solutions to be tested on the input software may be limited and cost and effort to run redundant tests on a software system may be reduced.

9 Claims, 5 Drawing Sheets

U.S. PATENT DOCUMENTS

| | | | |
|---|---|---|---|
| 7,310,624 B1 * | 12/2007 | Aggarwal et al. | 706/45 |
| 7,356,747 B2 * | 4/2008 | Hsiao et al. | 714/738 |
| 2003/0014234 A1 | 1/2003 | Rehtanz et al. | |
| 2003/0212661 A1 | 11/2003 | Avvari et al. | |
| 2005/0060007 A1 * | 3/2005 | Goetz | 607/48 |
| 2005/0060290 A1 | 3/2005 | Herscovici et al. | |

OTHER PUBLICATIONS

Herb Schwetman, Optimizing Simulations with CSIM18/OPTQUEST: Finding the Best Configuration, Proceedings of the 2000 Winter Simulation Conference, 2000, pp. 268-273, Published in: US.

* cited by examiner

| Classification | desireable branch |
|---|---|
| 1 | A - B<br>A - D |
| 2 | A - B - E |
| 3 | A - C - F - G<br>A - C - F |

METHOD AND SYSTEM FOR OPTIMIZING CONFIGURATION CLASSIFICATION OF SOFTWARE

CROSS REFERENCE TO RELATED APPLICATIONS

The present application is a continuation of U.S. application Ser. No. 11/098,824 filed Apr. 5, 2005, now U.S. Pat. No. 7,370,039. Said U.S. application Ser. No. 11/098,824 is hereby incorporated by reference in its entirety.

FIELD OF THE INVENTION

The present invention generally relates to the field of computer software, and particularly to a software tool to find an optimal system configuration of software.

BACKGROUND OF THE INVENTION

Various software testing tools have been developed to find an optimal system configuration for a software system. Conventionally, the goal of the software testing tool is to predict which of several system configurations will best meet the goal of the software system. With a complex software system, the range of possible configuration is large and the search for the best configuration may be time consuming and expensive.

A knowledge-based methodology has been utilized by software testing tools to minimize search efforts for the optimal system configuration. The software testing tool runs tests on a software system with various profiling data to determine an optimal solution for the software system. The tested results (optimal solutions) are classified according to the profiling data of the software system and stored in a knowledge base. The knowledge bases often comprise optimal configuration parameter sets for software systems so that the software testing tool can utilize the knowledge base to look up which parameter set worked best for a software system in the past. Generally, the utilization of the knowledge base reduces time and expense to run redundant tests on a software system.

Sometimes a new software system may be classified to use a predetermined configuration parameter set provided by the knowledge base, but the predetermined configuration parameter set may not be the optimal solution for the new software system configuration. In such a case, the knowledge base may need to be further defined to properly classify the new software. Often times, a full test with all possible system configurations on the new software system is unavoidable, a full test being time consuming and expensive.

Therefore, it would be desirable to provide a method and system for minimizing the number of possible solutions for a search of an optimal system configuration of new software.

SUMMARY OF THE INVENTION

Accordingly, the present invention provides a method and system for creating an additional knowledge base represented in a form of a decision tree and limiting the number of feasible parameters in order to determine an optimal solution for a new software system configuration.

In a first aspect of the present invention, a method for limiting the number of feasible parameters to determine an optimal solution for new software is provided. The optimal solution may be determined by defining a further decision tree branch by expanding a decision tree based on the category of the input software. The initial decision tree may be provided as a knowledge base manipulated by the method. The decision tree may include leaf nodes which store previously tested optimal configuration parameter sets. When profiling data for the input software system is received, the decision tree may be searched for a suitable configuration parameter set for the input software. The suitable configuration parameter set may be retrieved from the decision tree and tested whether it is the optimal solution for the input software. If the configuration parameter set is not the optimal solution, a further decision tree branch may be formed based on the category of the input software. The category of the software may be determined based on the profiling data of the input software. A desirable tree branch may be selected from a table including a predetermined set of desirable tree branches for each category of software. As a result, the number of solutions to be tested on the input software may be limited. The input software may be properly classified by adding a new branch to the selected desirable tree branch. The decision tree may be updated accordingly.

In a second aspect of the present invention, a software configuration classification module configured to create a knowledge base utilizing category information of input software systems is provided. The software classification module may comprise a software testing tool module configured to test a software system to determine an optimal configuration parameter set based on profiling data of the software system. The software testing tool may form a decision tree storing a previously tested optimal configuration parameter set at each leaf node of the decision tree. The decision tree may be utilized by the software testing tool module to find an optimal solution for a new software system. The software classification module may comprise a table storing desirable decision tree branches. A tree branch module coupled to the table may be configured to build a further decision tree storing a new optimal configuration parameter set. At least one of the desirable tree branches is selected from the table based on a category of the new software when the decision tree does not include the optimal configuration parameter set for the input software. Then, the tree branch module may instruct the software test tool module to build the further decision tree starting from the selected decision tree branch.

In an advantageous aspect of the present invention, the number of solutions to find an optimal system configuration may be limited based on the category (cluster) of the input software and thus result a reduction of time and cost to test new software. In another advantageous aspect of the present invention, a new profiling data of the new software system may be determined easily since only a predetermined category of software systems may be analyzed and compared with the new software system.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of the present invention are shown.

A knowledge-based software optimization software for creating an additional knowledge base and limiting the number of solutions to test is provided. In the following description, numerous specific descriptions are set forth in order to provide a thorough understanding of the present invention. It should be appreciated by those skill in the art that the present invention may be practiced without some or all of these specific details. In some instances, well known process operations have not been described in detail in order not to obscure the present invention.

The present invention is directed to a method and system for limiting the number of feasible parameters in order to determine an optimal solution for a new software system configuration and utilizing a knowledge base storing previously determined optimal solutions. The knowledge base may be represented in a form of a decision tree including leaf nodes which store previously tested optimal configurations. A software testing tool may be utilized to execute various feasible configurations to find optimal configurations and create an initial decision tree accordingly. When the knowledge base does not contain an optimal configuration for a new software system, an optimal configuration for the new software system may be searched by adding a further decision tree branches to the initial decision tree. In the present invention, a table including a predetermined set of a desirable tree branch for each category of software is utilized. A desirable tree branch may be selected from the table based on the category of the input software. The desirable tree branch may be a starting point of a subset of the decision tree to be created and utilized by the software testing tool to determine the new optimal configuration set. As a result, the number of feasible parameters (solutions) may be limited since only a subset of the decision tree is created.

Figure 1:
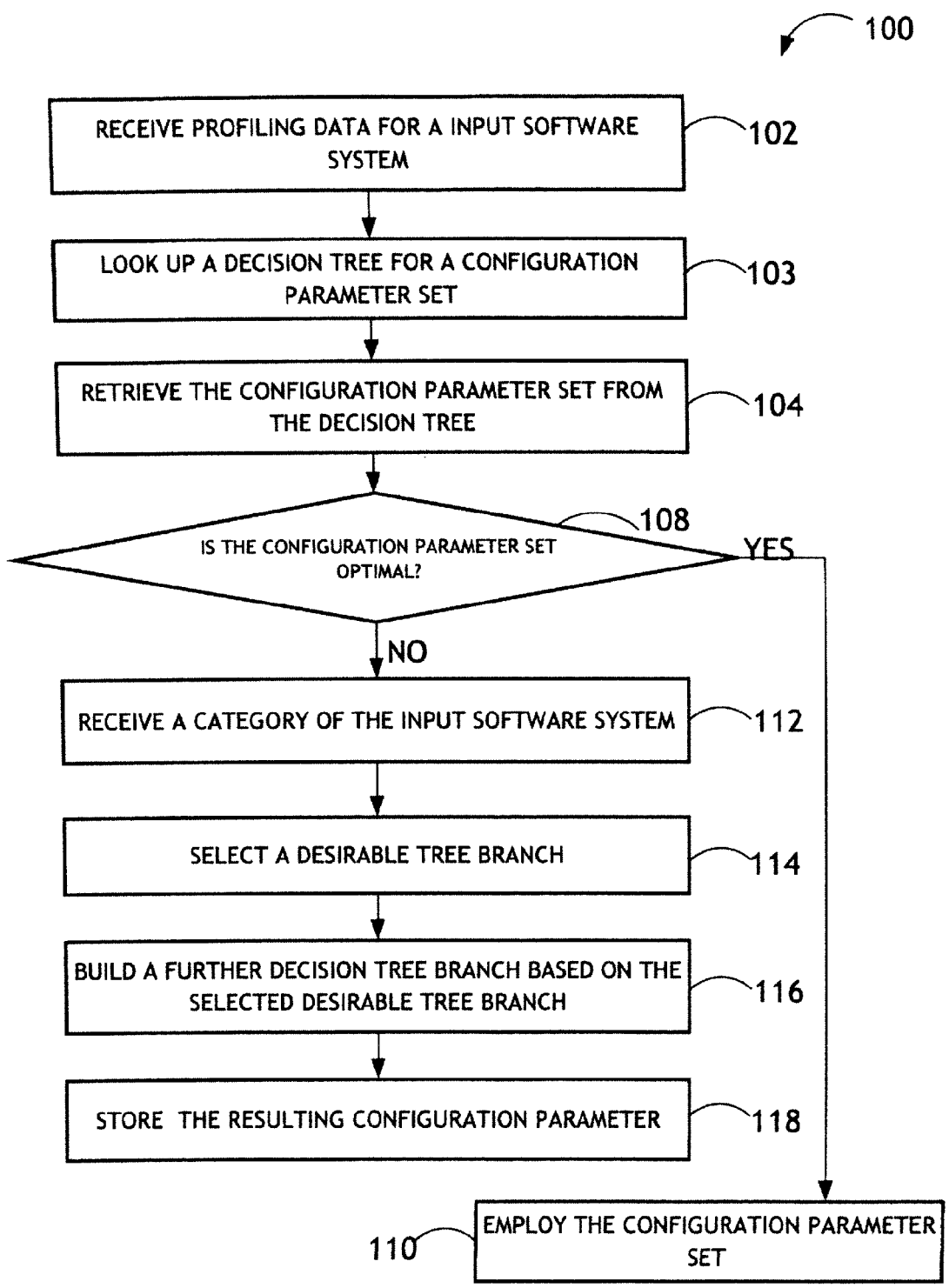
FIG. 1 is a flow diagram illustrating a method implemented by a system configuration classification module in accordance with an exemplary embodiment of the present invention.

Referring now to FIG. 1, a flow diagram 100 illustrating a method implemented by an exemplary embodiment of the present invention is shown. The method begins in step 102 in which profiling data for an input software system is received. The profiling data contains information of the input software which is obtained by analyzing the input software to determine how much time is spent in different parts of the input software during execution. Next, in step 104, a decision tree may be searched for a configuration parameter set suitable for the input software. An example of configuration parameter sets may include a CPU speed, a memory capacity, disk subsystem capabilities, system BIOS version, graphics adapter type, driver levels, operating system software version or the like. Further examples of system configuration parameters may include hardware details such as: L2/L3 cache size, memory type and speed, memory bandwidth, core logic chipsets, network/disk adapter types, disk speeds/types/capacity or the like. The decision tree may be formed initially by the software testing tool which has conducted a various search through feasible configurations of software systems. The feasibility of a configuration is often determined by whether or not the software system meets all of the requirements specified by the software system. The software testing tool may build a decision tree to develop successive sets of feasible configurations and result to store an optimal configuration set at a leaf node. It should be appreciated that there are various way to design a decision tree as a knowledge base.

Conventionally, decision trees has been utilized as a knowledge base to lay out the conditions and steps required for decisions. For configuration applications, decision trees are utilized for capturing structured decision-making processes. The knowledge for these applications may be structured into a set of steps and decision points represented by nodes of the decision tree. For example, the knowledge base may be a decision tree that is based around the system configuration parameters and is organized from most general components to the most specific components. The software testing tool may start with more significant system configuration parameters such as CPU types, number of CPUs, base OS type, and work towards less significant system configuration parameters such as disk capacity in order to structure the decision tree. It should be appreciated that the relative importance of these system configuration parameters (e.g. hardware details) is application specific, and the decision tree may be restructured based on how much performance varies between differences in a given component.

The configuration parameter set suitable for the input software may be retrieved from the decision tree in step 106. Then, the software testing tool module may be executed to check whether the retrieved configuration parameter set is the optimal solution 108. In a particular embodiment, the system may determine whether the resulting score for the retrieved configuration of the input software is equal to or better than the current best score for a given configuration. In such a case, the retrieved configuration parameter set may be considered optimal. Alternatively, the system may define a tolerance around the current best score. If the resulting score is within the tolerance range, the resulting score may be determined to be an effective "equality" of the current best.

If the optimal solution has been found, the retrieved configuration parameter set may be used for the input software 110. If the optimal solution has not been found, the category of the input software may be determined based on the profiling data 112. Alternatively, the category of the input software may be received from a user through a graphic user interface displaying a list of categories. In step 114, based on the category of the input software, the method may select at least one desirable tree branch which may be grown to test new configuration parameter sets for the search of the optimal solution. When an optimal solution is found after several tests on the input software based on the desirable decision branch, the decision tree may be updated with a further decision tree branch which holds new configuration parameter sets.

Figure 2:
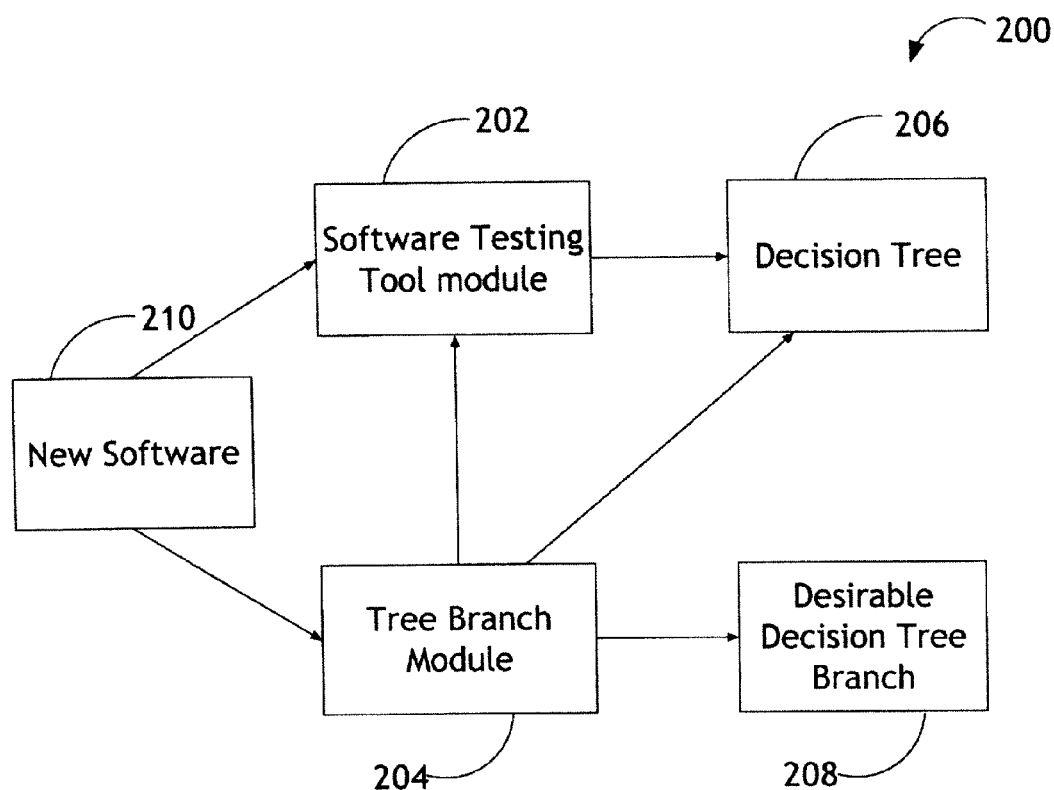
FIG. 2 is a block diagram of an exemplary system capable to implement the method illustrated in FIG. 1 in accordance with the present invention.

Referring now to FIG. 2, a block diagram 200 of an exemplary software configuration classification module capable to implement the method illustrated in FIG. 1 is shown. The software configuration classification module may comprise a software testing tool 202 configured to find a best (optimal) configuration parameter set for a new software system which may be an optimal solution, a knowledge base 206 for providing system configuration classification information. In a particular embodiment of the present invention, a decision tree 206 may be utilized as a knowledge base. The decision tree 206 coupled to the software testing tool 202 is utilized as a knowledge base providing the optimal configuration parameter set. A configuration parameter set suitable for the new software may be retrieved from the decision tree 206 based on profiling data of the new software. When the retrieved configuration parameter set is not an optimal solution for the new software system configuration, a tree branch module 204 may look up a desirable tree branch table 208 to find at least one desirable tree branch suitable for classifying the new software. The desirable tree branch may be selected based on a category of the new software. Then, the tree branch module 204 may instruct the software testing tool to search the solution space limited by the selected desirable tree branch.

Figure 3:
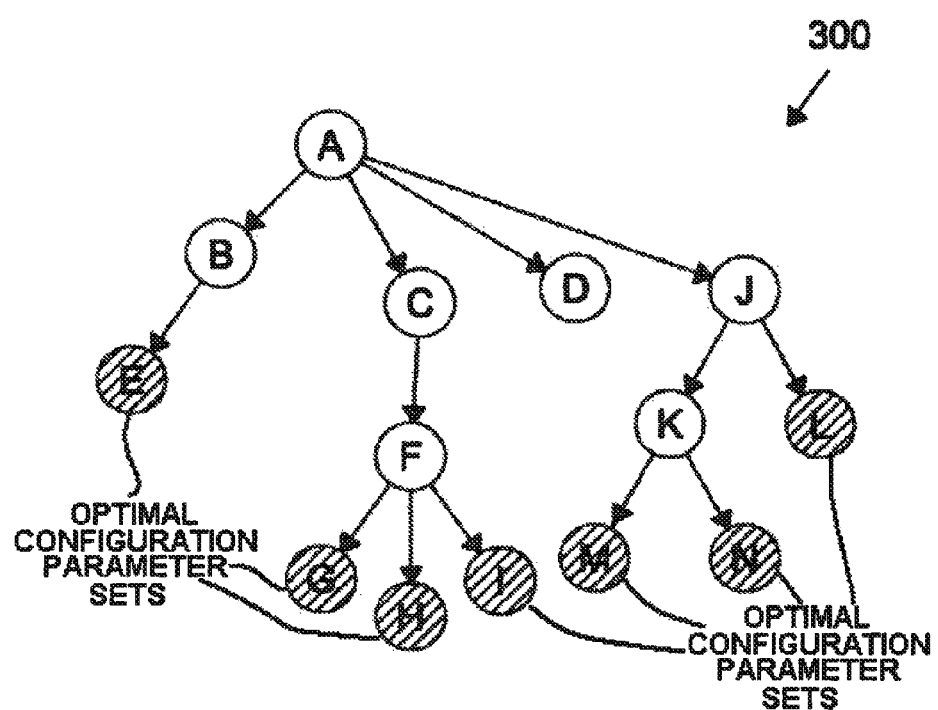
FIG. 3 is a depiction of a decision tree utilized in the system configuration classification module in FIG. 1.

Reference is made to FIG. 3 depicting an exemplary decision tree structure 300 in accordance with the present invention is shown. A decision tree 300 may be grown from configuration parameter data using a recursive partitioning algorithm to create a tree which has good prediction of classes on new configuration data. The decision tree 300 may include a plurality of nodes A-M built by various test runs by the software testing tool. Each node except leaf nodes represents a condition or a step to find an optimal configuration. Each path (branch) has a leaf node storing an optimal configuration parameter set which has been determined previously. For example, A-B-C path is created while the software testing tool is testing conditions A and B for a certain software system. Leaf node C has the optimal configuration parameter set for the software system. Therefore, if input software has been tested before, the decision tree may include a leaf node storing the optimal configuration parameter set for the input software resulted from previous test runs.

Figures 4, 5:
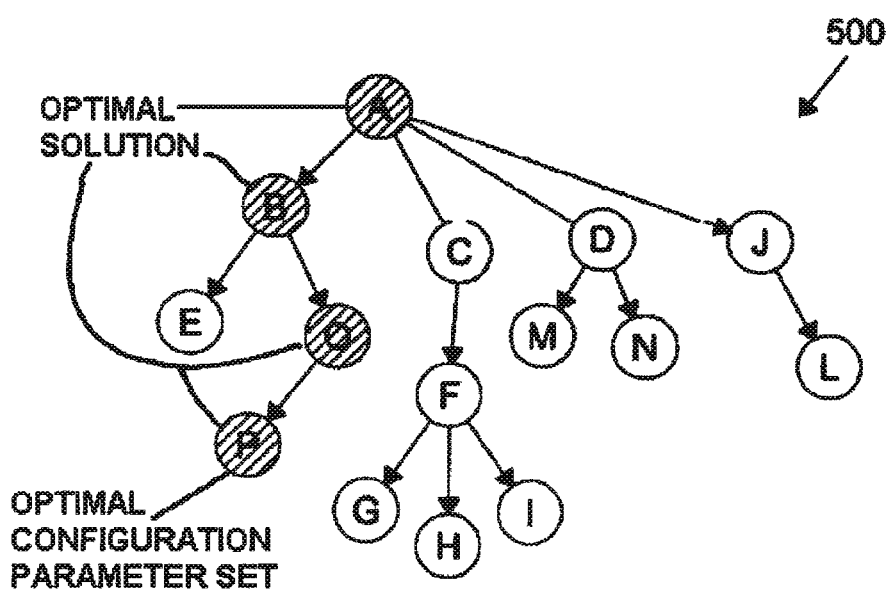
FIG. 4 is a depiction of a table including desirable tree branches utilized in the system configuration classification module in FIG. 1.
FIG. 5 is a depiction of the decision tree in FIG. 3 after a new optimal solution has been found.

Referring now to FIG. 4, an exemplary desirable branch table 400 is shown. The desirable branch table 400 may include a category element 402 and a desirable branch element 404. The desirable branch table may be utilized to limit the number of solutions to test to determine a new optimal solution. For example, when input software is categorized as category 1, the tree branch module retrieves desirable branches 408 (A-B, A-D) accordingly. The tree branch module may instruct the software tool module to search A-B, and A-D paths for the optimal solution of input software. While the search progresses, the decision tree may be grown (built) only from A-B branch or A-D branch. Referring now to FIG. 5, the decision tree 300 is depicted after an exemplary optimal solution for the input software has been found. The decision tree 300 includes an A-B-O-P branch added to the desirable branch A-B. Node P may store the optimal configuration parameter set for the input software.

In a particular embodiment of the present invention, the software testing tool may build a decision tree to develop successive sets of feasible configurations and result to store an optimal configuration set at a leaf node. The exemplary steps to construct a decision tree suitable for being utilized in an embodiment of the present invention is described as follow. The exemplary steps are described only for illustrative purpose only. It should be appreciated that there are various way to design a decision tree as a knowledge base suitable for being utilized in the present invention.

Exemplary Steps to Construct a Decision Tree

Step 1) Organize the Data into Vectors

The software testing tool may create vectors of N dimensions for each data point, where N is the sum of all system parameters, profiling, data, and tuning variables. The possible values for each attribute are supplied, and there are two basic types: Ordered and Unordered. Unordered variables have discrete values which reside in a set of known possible values with no direct comparability between values. Ordered variables are generally real numbers with upper and lower bounds. System types are going to be unordered parameters.

Step 2) Generate Clusters of Vectors Based on their Overall Score

The software testing tool may use proper algorithm generate clusters of similarly scoring vectors. For example, the convex hull of the vectors in N dimensions may be computed. It is to be noted that any necessary algorithmic parameters for cluster generation may be supplied initially. For example, if one were computing the convex hulls, the minimum number of points which constitute a cluster may be supplied. Then, clusters may be generated based around each possible value for each unordered top-level system parameter. The software testing tool may store the parameters for each cluster, so that new results can be easily identified with a known cluster of vectors with similar scores.

Step 3) Generate Clusters of Vectors Based on Ordered System Parameters and Tuning Variables.

The software testing tool may take the cluster with the highest scores for each system type, and generate smaller clusters based upon each tuning variable and each ordered system parameter again using the clustering technique.

Step 4) Derive Relative Importance of System Attributes and Tuning Values for Different System Types.

Given these clusters generated in step 3 based, the software testing tool may identify which tuning values and ordered system attributes are important as for given system configuration (unordered system parameter), based upon which parameters have clusters with tight boundaries within the best scoring cluster. Using the overall set of boundaries for the cluster, the software testing tool may prioritize the attributes in order of the distance of between their boundaries normalized to their overall range. This may provide an ordered list of system parameters. A decision trees may be created from these clusters, where one decision tree may be exist per unordered system parameter value. (i.e. if there is an unordered variable called CPU type, with two possible values: Intel CPUs and IBM CPUs, the software testing tool may have two separate decision trees based on CPU type).

Step 5) Prioritize System Parameters for Each Decision Tree, and Generate a Decision Tree For Each System Type.

To generate the decision tree, a simple greedy top-down decision tree construction technique may be utilized. It should be noted that there are various ways to construct a decision tree suitable for being implemented by an embodiment of the present invention. This ordering determines their placement on the decision tree, with the parameters with the tightest boundaries closest to the top. The splitting criteria between each node are based upon the average values for each system parameter within the best scoring cluster which contains vectors with values in a given range.

Figure 6:
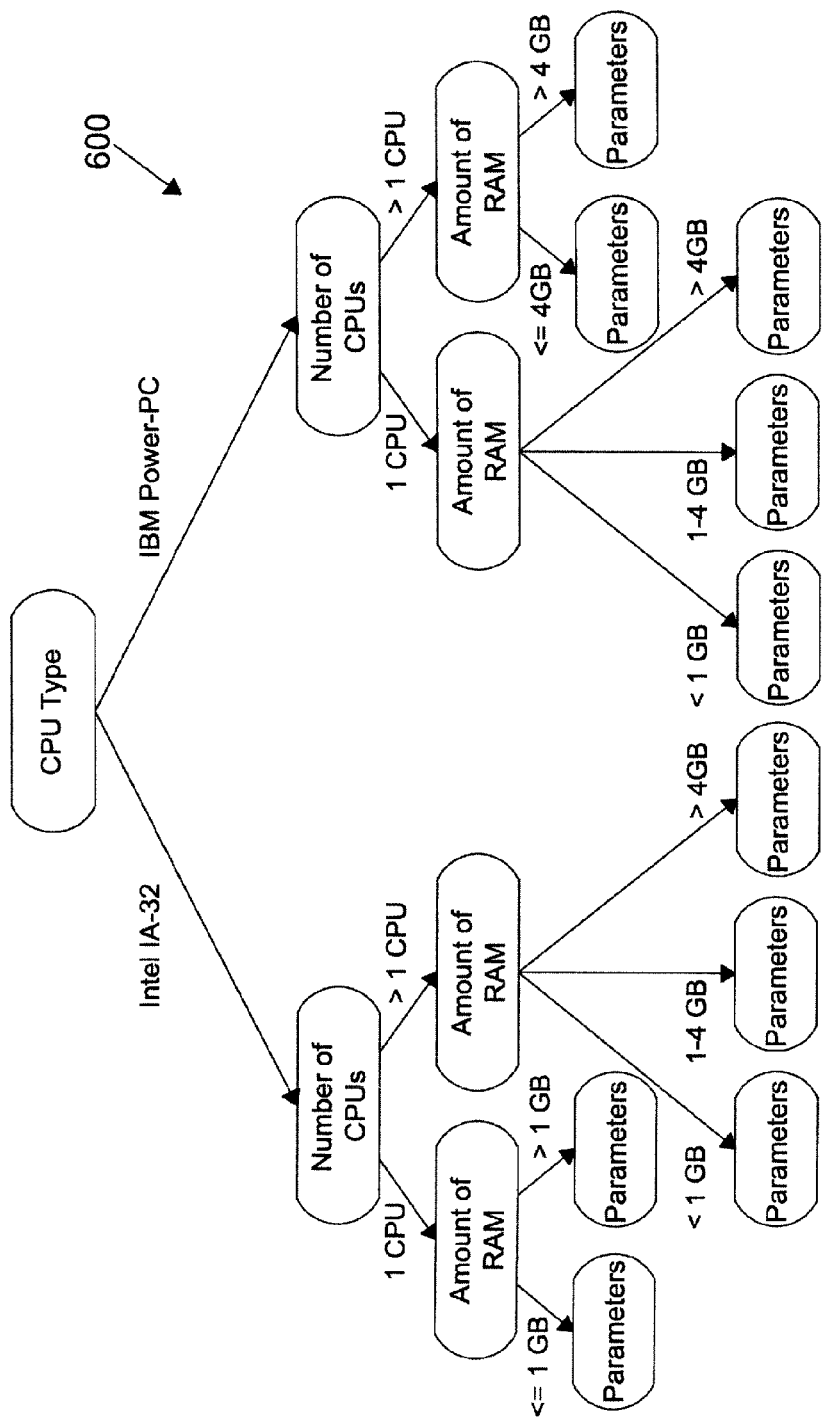
FIG. 6 is a depiction of another decision tree utilized in the system configuration classification module where the decision tree is constructed in accordance with a particular embodiment of the present invention.

Referring to FIG. 6, a depiction of an exemplary decision tree 600 constructed by the above described exemplary steps is shown. In an embodiment of the present invention, the amount of memory may be determined to be an important system parameter. Three clusters may be generated based around memory amount. The software testing tool may split three ways to the next most important parameter in the decision tree 600.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A software system configuration classification module configured to create a knowledge base intelligently, comprising:
   - a computer readable medium for storing the software system configuration classification module;
   - a software testing tool module for testing a software system to determine an optimal configuration parameter set, the optimal configuration parameter set determined based on profiling data of the software system, the software testing tool module being configured to create a decision tree, said software testing tool being configured to create a plurality of vectors of a number of dimensions, said number of dimensions based upon a sum of system parameters, data and tuning variables; generate clusters of similarly scored vectors; generate additional clusters based upon ordered system parameters and tuning variables; and determine an ordered list of system parameters;
   - the decision tree created from an unordered system parameter value from the ordered list of system parameters, the decision tree configured to store a previously tested optimal configuration parameter set at a leaf node and utilized by the software testing tool module to determine an optimal solution for a new software system;
   - a table storing a plurality of desirable decision tree branches, each of the plurality of desirable decision tree branches associated with a corresponding predetermined category of software systems; and
   - a tree branch module coupled to the decision tree and the table, the tree branch module configured to build a further decision tree branch storing a new optimal configuration parameter set when the decision tree needs to be defined further to classify the new software system,
   - wherein the tree branch module is configured to use at least one of the plurality of desirable tree branches selected from the table based on a category of the new software system in order to build the further decision tree branch.

2. The software system configuration classification module as described in claim 1, wherein the tree branch module receives a profiling data of the new software system.

3. The software system configuration classification module as described in claim 2, wherein the profiling data of the new software system is provided by a user.

4. The software system configuration classification module as described in claim 2, wherein the category of the new software is determined based on the profiling data of the new software system.

5. The software system configuration classification module as described in claim 1, the tree module further comprising a graphic user interface displaying a list of categories of software.

6. The software system configuration classification module as described in claim 5, wherein the category of the new software is provided by a user through the graphic user interface.

7. The software system configuration classification module as described in claim 1, wherein the tree branch module enables the software testing tool mode to search the new configuration parameter set by testing the new software system.

8. The software system configuration classification module as described in claim 1, wherein the decision tree includes a plurality of leaf nodes storing a configuration parameter set of an optimal solution previously tested.

9. The software system configuration classification module as described in claim 8, wherein the decision tree includes a plurality of nodes representing conditions and steps of a plurality of the optimal solutions.

* * * * *